Feb. 25, 1941.  F. M. RODDY  2,232,828
ROTARY CUTTING MACHINE
Filed May 6, 1939  4 Sheets-Sheet 3

Inventor
Fred M. Roddy.
By Cameron, Kerkam + Sutton.
Attorneys

Feb. 25, 1941.  F. M. RODDY  2,232,828
ROTARY CUTTING MACHINE
Filed May 6, 1939  4 Sheets-Sheet 4

Inventor
Fred M. Roddy
By Cameron, Kerkam & Sutton
Attorneys

Patented Feb. 25, 1941

2,232,828

UNITED STATES PATENT OFFICE 2,232,828

ROTARY CUTTING MACHINE

Fred M. Roddy, Kingsport, Tenn.

Application May 6, 1939, Serial No. 272,273

21 Claims. (Cl. 83—6)

This invention relates to cutters, and more particularly to rotary cutters suitable for cutting, chopping, granulating, grinding, pulverizing or shredding a wide variety of materials such as plastics, grain, rubber, bark, roots, tobacco, paper, and the like.

Heretofore rotary cutters have been proposed in which rotating knives cooperate with fixed knives arranged about some portion of the periphery of the path of rotation of the rotary knives to afford the desired cutting action. These cutters have proved inefficient in operation as the feed openings and screened areas for removal of the ground or granulated material have of necessity limited the peripheral space available for the placing of the fixed or stationary knives. In some of these prior machines the fixed knives have been arranged about the upper half of the periphery and the screened removal area has occupied the lower half of the periphery, thus making it necessary for the rotary knives to throw the material upwardly into the area of the fixed knives for grinding with consequent loss of efficiency. Other arrangements of the fixed knives have been suggested to overcome efficiency losses, but none of these has provided an efficient device which is compact, easy to clean and relatively inexpensive to build, or which can run full of material for extended periods at high speeds without overheating.

It is accordingly one of the objects of the present invention to provide a novel rotary cutter of the general type above indicated, but which will overcome the difficulties experienced with the cutters heretofore known to the art.

Another object is to provide a rotary cutting or granulating machine of improved construction which is compact, relatively inexpensive, efficient, of high capacity, and capable of running at high speeds for extended periods without overheating.

A further object is to provide a novel rotary cutter in which the several parts are easily accessible for cleaning and other purposes.

Still another object is to provide a novel cutting device of the character described which is adapted to run full of material at all times.

A still further object is to provide a new and improved rotary cutter in which is embodied an increased number of fixed knives spaced about the entire periphery of the path of rotation of the rotary cutting means, whereby a more intensive grinding or cutting action may be obtained.

Another object is to provide a novel rotary cutter in which the openings through which the material is fed to and discharged from the machine are offset axially from the fixed knives.

Another object is to incorporate in a cutting mechanism of the character described a mangle knife which is offset from the fixed knives and cooperates with the rotary cutting means in breaking up the material preliminarily to operation thereon by the fixed knives.

With these and other objects in view, all of which will become more apparent from the following description, several illustrative embodiments of the present invention have been shown in the accompanying drawings. It is to be expressly understood, however, that these embodiments are shown in the drawings and hereinafter described for the purpose of illustration only, and are not to be construed as defining the limits of the invention, reference being had for this latter purpose to the appended claims.

In the accompanying drawings.

Generally speaking, the present invention comprises a rotary cutter in which a plurality of fixed knives are equidistantly arranged about the entire periphery of the path of rotation of a rotary cutting means, and the material feeding means and screened removal area are offset axially from the fixed knives. A fixed mangle knife may also be provided, offset axially from the fixed knives and extending over the screened removal area and beneath the feeding means, for cooperation with the rotary cutting means in effecting a preliminary breaking up of the material before it enters the fixed knives, in which case the rotary cutting means preferably have a length equal to the sum of the length of a fixed knife and the length of the mangle knife. By placing the fixed knives about the entire periphery of the path of rotation of the rotary cutting means, more fixed knives may be used than heretofore possible, thereby increasing the cutting action without diminution of the compactness of the cutting parts. Such an arrangement of the fixed knives provides an intensive grinding and cutting of the material in a relatively small space, thus decreasing the friction of stirring the material with a consequent increase in capacity and efficiency of operation. This arrangement also permits the use of higher speeds of rotation of the rotary cutting means and allows the cutter of the present invention to run full of material at all times without overheating, further increasing the efficiency of operation.

Referring now to the several figures, in which like reference characters indicate similar parts, and more particularly with reference to Figs. 1-4, 10 is any suitable base or support for the novel cutter of the present invention upon which is mounted any suitable driving means, here shown as an electric motor 11 provided with a shaft 12. Shaft 12 is drivingly connected through flexible coupling 13 with rotor shaft 14, the latter being provided with suitable bearings 15 and 16 (Fig. 3) mounted in bearing housings 17 and 18, respectively, carried by base 10. Mounted upon and secured to enlarged portion 19 of shaft 14 is a flywheel 20 which is of suitable size and weight for overcoming the shocks due to cutting and preventing excessive vibration of the machine. Suitably secured to the end of shaft 14 is a rotor 21, a key 22 being here shown for this purpose. Formed integrally with and extending axially from rotor 21 are a plurality of rotor arms 23, here shown as two in number (Fig. 4), upon which are mounted rotor knives 24, each of these knives being provided with a pair of bolts 25 which pass through slots 26 in the knife and washers 27 and are threaded into the rotor arm 23 so as to permit adjustment of the knife radially of the rotor.

Suitably secured to base 10, as by bolts 28, in surrounding relation to portions of rotor 21 and rotor knives 24 is a unitary annular knife bed 29 provided with a sealing ring 30 designed for sealing cooperation with rotor 21. The inner surface of knife bed 29 is conical in shape as indicated at 31, and is provided with a plurality of knife recesses 32 spaced equidistantly about its internal periphery in which are adjustably mounted bed knives 33 designed for cooperation with rotor knives 24, each knife 33 being provided with an adjusting screw 34 and a locking screw 35, as shown best in Fig. 4.

Secured to the bottom half of knife bed 29 by bolts 36 and dowel pins 36' is a substantially semicylindrical lower housing or casing element 37 provided with a delivery conduit 38. Mounted on suitable ledges inside casing element 37 and readily removable therefrom is a screen 39 of any desired weight and mesh. Also carried by lower casing element 37 is a mangle knife 40 adjustably secured in a recess formed in the horizontal surface of one side of said casing member by means of bolts 41 passing through slots 42 in the knife and washers 43. Mangle knife 40, the cutting edge of which lies in the same horizontal plane with the axis of rotor shaft 14 and the upper surface of lower casing element 37, is designed for cooperation with rotor knives 24, each of the rotor knives preferably having a length equal to the sum of the length of a bed knife 33 and the length of mangle knife 40.

Figure 1:
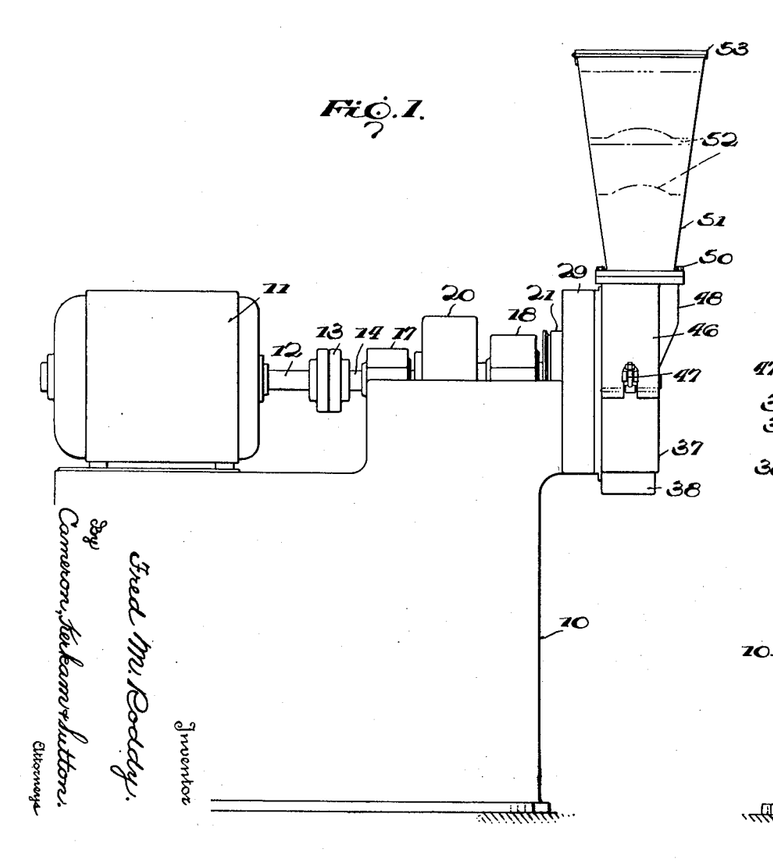
Fig. 1 is a side elevation of one embodiment of the novel rotary cutter of the present invention.
Figure 2:
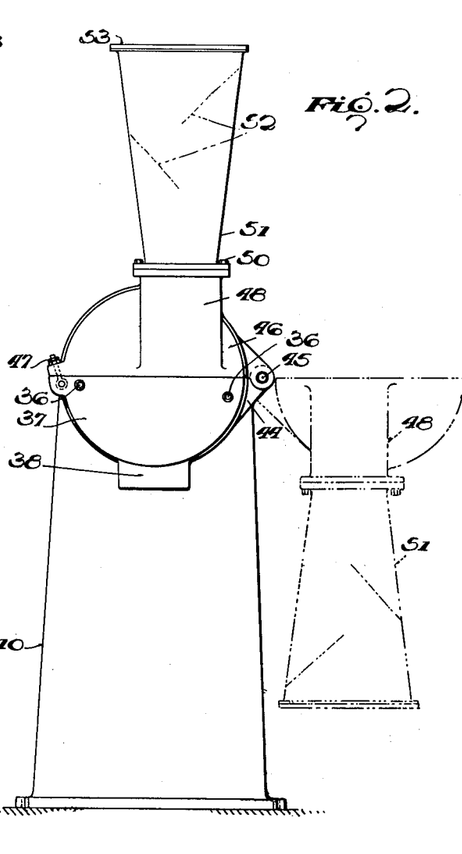
Fig. 2 is an end view of the embodiment shown in Fig. 1, as seen from the right, with the open position of the casing and hopper shown in dotted lines.
Figure 3:
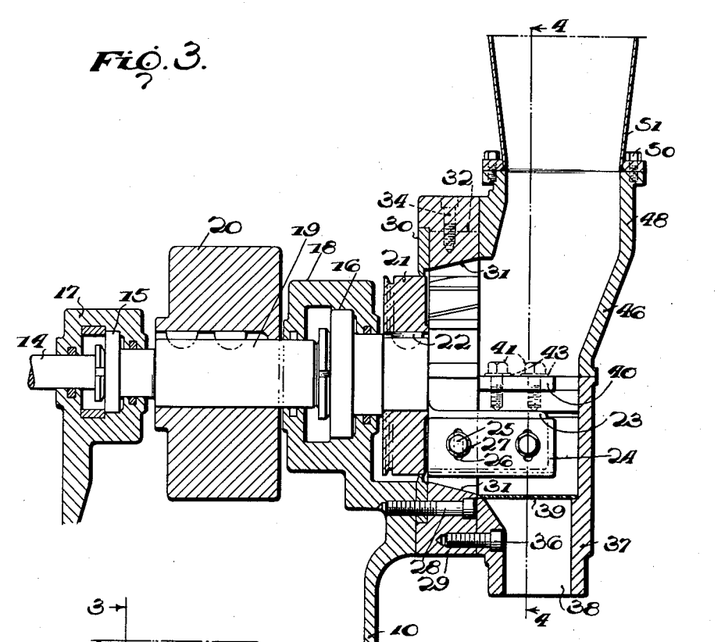
Fig. 3 is a sectional side view of a portion of the machine of Fig. 1 taken substantially on the line 3—3 in Fig. 4.

Just to the right (as viewed in Fig. 4) of the position of mangle knife 40, lower casing element 37 is provided with a shoulder or boss 44 having a hinge pin 45 mounted therein. Rotatably mounted upon pin 45 is a generally semi-cylindrical upper casing element 46 designed to cooperate with lower casing element 37 and to be locked thereto when in closed position by a clamping eyebolt 47 pivotally mounted on casing element 37 at the side opposite boss 44. Casing element 46 is provided with an upwardly extending portion 48 forming a feeding conduit offset laterally to the right as viewed in Figs. 2 and 4 from a vertical plane through the axis of rotation of the machine, and with an internal, axially extending, horizontal ledge or flattened portion 49 adjacent the lower end of the feeding conduit, the function of which will be more fully described hereinafter. Secured to the upper end of conduit forming portion 48, as by bolts 50, is a hopper 51 of any suitable construction which, if desired, may be provided with suitable baffle plates 52 and a lid or cover 53 (Figs. 1 and 2).

Upper casing element 46 is also provided with an inwardly extending shoulder 54 designed to engage one end of screen 39 to lock it in position against a shoulder 55 of lower casing element 37 when the casing is closed, the other end of the screen being properly positioned by abutment against the under side of another shoulder 55' formed in casing element 37 directly beneath the position of mangle knife 40.

With the above described embodiment of the present invention assembled as described and bed knives 33, mangle knife 40 and rotor knives 24 suitably adjusted with respect to one another, the material which it is desired to grind or granulate is fed into the hopper 51 whence it passes through conduit 48 into the interior of casing elements 37 and 46 and ultimately into the region of the bed knives 33, screen 39 keeping all but particles smaller than the mesh of the screen from entering delivery conduit 38. As the material enters the chamber provided by casing elements 37 and 46, which chamber is offset axially from the bed knives, the larger particles may first be broken up and chopped into comparatively small pieces, but not small enough to pass through the screen 39, by the rotary knives 24 and mangle knife 40. The chamber being full of material, the rapidly rotating knives 24 effect continuous vigorous stirring of the mass and force the particles into the region of the bed knives 33. Here the rotating knives 24 and bed knives 33 effect a smooth, concentrated and rapid grinding, cutting or granulating of the material, shocks being reduced by the relatively large number of bed knives used and their uniform arrangement about the entire periphery of the knife bed 29. The conical surface 31 of the knife bed provides a relatively large opening through which the particles being thrown around by the rotor knives may enter the region of the bed knives, and also continually feeds the ground and granulated material back to screen 39 by gravity, where, if of desired size, it will pass through screen 39 and out conduit 38, but if larger than the mesh of the screen will again be picked up by the rapidly rotating knives 24 and again subjected to grinding between the latter and the bed knives 33. Sealing ring 30 prevents the material from passing outwardly about rotor 21. When material of relatively large particle size is being ground or granulated, flywheel 20 acts through its inertia to iron out any shocks caused by the preliminary breaking action of mangle knife 40, thereby insuring a smooth-running machine.

Due to the high speeds at which the cutter of the present invention is capable of running and at which it is normally run, provision must be made to prevent material from being thrown by the rapidly rotating knives 24 back into feed conduit 48 and hopper 51. To this end, the feed conduit is offset from the center line of the machine as above described, and flattened baffle portion 49 of casing 46 is provided so as to deflect downwardly and prevent from passing up into the feed conduit any material picked up by the rotor knives 24 which might tend to be thrown upwardly as the latter approach the upper portion of their path of movement. As the cutter of the present invention is designed to run full of material, there may be a tendency for the material in hopper 51 to be considerably agitated by the effect of the rapidly rotating knives 24, in spite of the offset position of the feed conduit and the provision of ledge 49. Baffles 52 may therefore be provided in the hopper 51 to keep the material in the hopper from being thrown out, cover 53 also serving for the same purpose. Baffles 52 likewise insure a constant feed of material downwardly in hopper 51 by breaking up any tendency of the material to cake or clog in the hopper.

When a batch of material has been ground, the interior of the cutter of the present invention is readily accessible for cleaning, removal and sharpening of knives, and the like, by releasing lock bolt 47 and rotating upper casing element 46 and hopper 51 about pin 45 to the position shown in dotted lines in Fig. 2, thereby opening the casing or housing along its horizontal center line and providing easy access to the knives, screen and other parts which lie axially outwardly of the rotor 21.

Figure 4:
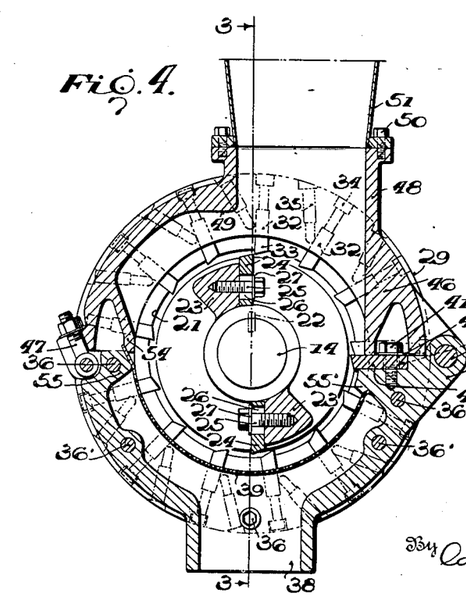
Fig. 4 is a sectional end view of the same embodiment taken substantially on the line 4—4 of Fig. 3.
Figures 5, 6, 7:
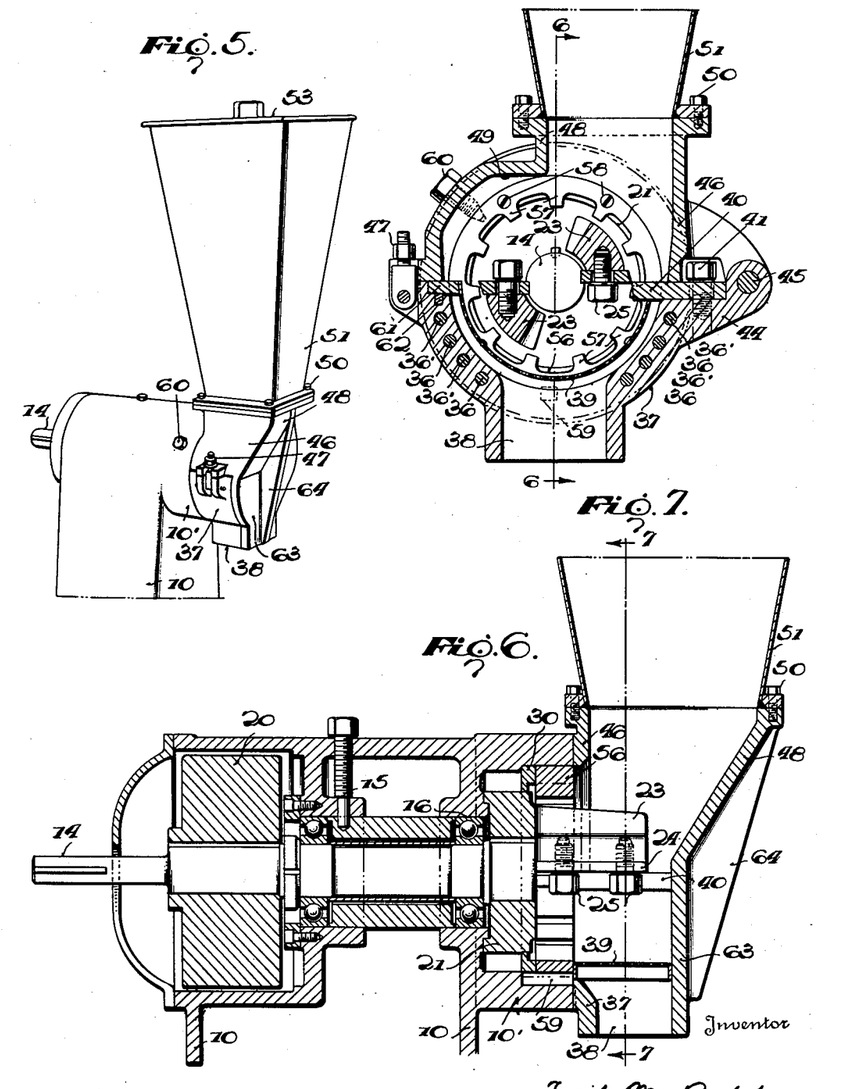
Fig. 5 is a perspective view of a second form of rotary cutter embodying the present invention.
Fig. 6 is a sectional side view of the embodiment of Fig. 5 taken substantially on the line 6—6 of Fig. 7.
Fig. 7 is a sectional end view of the second embodiment taken substantially on the line 7—7 of Fig. 6.

Referring now to Figs. 5-7, another embodiment of the novel cutter of the present invention is here shown, such as might be more particularly suited for machines of smaller size than that of Figs. 1-4, and for machines in which the necessity for more thorough or frequent cleaning between the working of batches of material requires greater access to the grinding and granulating elements.

As in the case of the first embodiment, a base 10 is provided for the machine supporting bearings 15 and 16 within which is journaled rotor shaft 14 carrying a suitable flywheel 20. Formed integrally with shaft 14 is rotor 21 having a pair of axially extending rotor arms 23 to which rotor knives 24 are adjustably secured in the manner previously described. Base 10 is provided with an annular extension 10' forming a housing surrounding rotor 21 and a portion of the length of arms 23 and knives 24. Extension 10' is suitably recessed at its outer end to receive a sealing ring 30, designed for sealing cooperation with rotor 21, and an annular, unitary cutter ring 56 which has formed integrally therewith a plurality of circumferentially spaced, double edged cutting elements 57 projecting radially inwardly from the inner surface thereof. Sealing ring 30 may be secured to cutter ring 56 by screws 58. A key 59 prevents rotation of cutter ring 56 and sealing ring 30 relatively to their housing 10', while a set screw 60 locks these elements against axial movement.

Secured to the outer end of extension 10' is an open ended lower casing element 37 provided with an open ended delivery conduit 38, a shoulder or boss 44 in which is mounted a hinge pin 45, and a clamping eyebolt 47. Casing element 37 also supports mangle knife 40 adjustably secured thereto by bolts 41. In this embodiment of the invention, the screen 39 which covers delivery conduit 38' abuts at one end against the bottom of mangle knife 40 and is provided at the other with an outwardly projecting extension 61 which fits into a suitable recess formed in the horizontal surface of casing 37 diametrically opposite that in which mangle knife 40 is secured. In order to insure proper installation of the screen 39 and to prevent it from moving out of position, during operation of the machine, extension 61 is provided with a pair of positioning pins 62 which are adapted to engage complementary holes formed in the casing element 37.

Pivotally mounted on hinge pin 45 is upper casing element 46 designed for cooperation with lower casing element 37 and adapted to be locked thereto by bolt 47. The upper casing element of Figs. 5-7 differs from that of Figs. 1-4 in that it is provided with a downwardly extending face plate 63 adapted when in closed position to close the open end of lower casing element 37 and delivery conduit 38. Casing element 46 is also provided with an upwardly extending, outwardly flared feed conduit portion 48 offset laterally from the vertical axis of the machine, as best indicated in Fig. 7, and with an axially extending, horizontal ledge or baffling surface 49. A stiffening web 64 may be provided to strengthen the connection between the outer inclined wall of feed conduit 48 and face plate 63. Secured to the upper end of feed conduit 48, as by bolts 50, is a hopper 51 provided with a lid or cover 53.

The operation of this second embodiment of the invention is in every respect similar to that already described with reference to the machine of Figs. 1-4. When a batch of material has been worked and it is desired to clean the machine, replace cutters, or the like, ready access may be had to the entire interior by merely releasing lock bolt 47 and rotating hopper 51, upper casing element 46 and face plate 63 about pin 45, thereby uncovering the whole forward end of the machine. After first removing screen 39, mangle knife 40 and set screw 60, the assembly of cutter ring 56 and sealing ring 30 may be slid out of their housing 10' for cleaning or sharpening of the cutting edges of elements 57. The cutting ring 56 may also be detached from sealing ring 30 and reversed when one set of edges of cutting elements 57 have been dulled so as to present the opposite edges thereof for cooperation with rotary knives 24.

Figure 8:
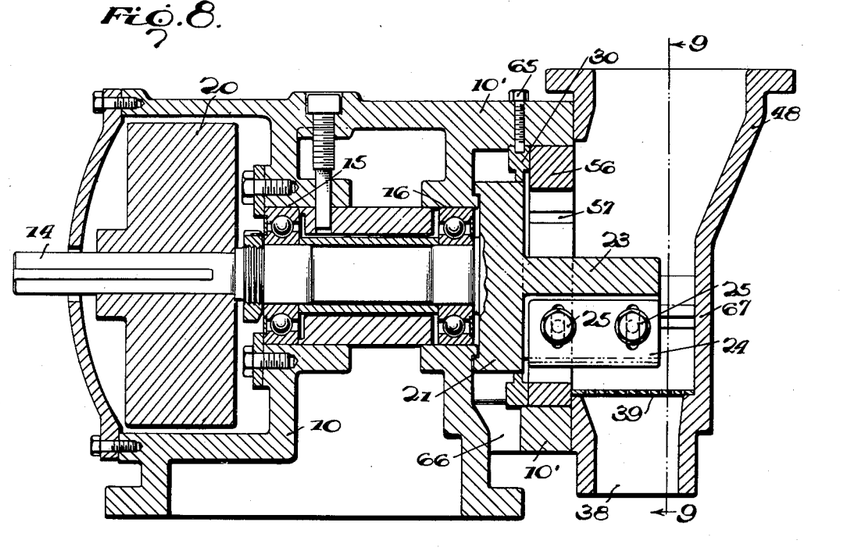
Fig. 8 is a sectional side view of still another embodiment of the invention taken substantially on the line 8—8 of Fig. 9.
Figure 9:
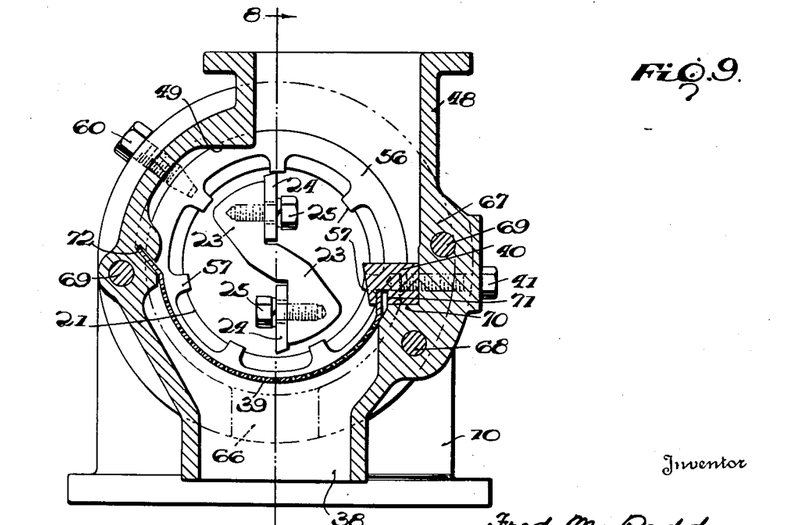
Fig. 9 is a sectional end view of the embodiment of Fig. 8 taken substantially on the line 9—9 of the latter figure.

Referring now to Figs. 8-9, the embodiment of the invention here shown is of simpler and less expensive construction than those of Figs. 1-7, and is well suited for smaller machines such as those adapted for laboratory use.

Except for the features hereinafter specifically mentioned, this third embodiment of the invention is of substantially the same construction, and operates in the same manner, as that shown in Figs. 5-7. One difference, however, is that the rotor 21 and rotor arms 23 are formed integrally with shaft 14, instead of having a keyed connection therewith. Also, the sealing ring 30, instead of being secured to the cutter ring 56, is simply held in place in housing 10' by a set screw 65, an opening 66 being provided in the bottom of the housing behind the sealing ring to permit the escape of any dust which may pass between the ring and the rotor.

The principal difference between the mechanism of Figs. 8 and 9 and those previously described resides in the construction of the casing which closes the front end of the cutting portion of the machine and provides the chamber to and from which the material to be cut is supplied and delivered. As shown, this casing is formed as an integral casting 67 adapted to be accurately positioned against the open end of housing 10' by means of a dowel 68 and secured thereto by bolts 69. Dowel pin 68 also serves to relieve the bolts 69 of the shock of impacts to which casing 67 is subjected. The interior of casing 67 is provided with an axially extending shoulder 70 on which is supported the mangle knife 40, the latter being adjustably secured in place by bolts 41 which extend horizontally through the wall of casing 67 so as to be adjustable from the outside thereof. The bottom of mangle knife 40 is axially slotted at 71 to receive and position one end of the screen 39, the other end of which fits into another slot 72 formed in the interior of casing 67 at a point substantially diametrically opposite mangle knife 40. As in the first two embodiments, the feed conduit portion 48 of the casing 67 is laterally offset from the axis of the cutter, and the casing 67 is provided with a flattened, internal baffling surface 49, so as to prevent the material within the casing from being thrown back into the feed conduit and hopper.

When it is desired to obtain access to the interior of this third embodiment of the invention for cleaning, replacement of parts, and the like, bolts 69 are removed and the casing 67 is slid outwardly off dowel 68, leaving the entire end of the machine open. After casing 67 has been removed, screen 39 may be slid laterally (to the left as viewed in Fig. 8) out of its seat in the casing for cleaning or replacement. Mangle knife 40 may be similarly removed for sharpening or inspection after withdrawal of bolts 41.

Figure 10:
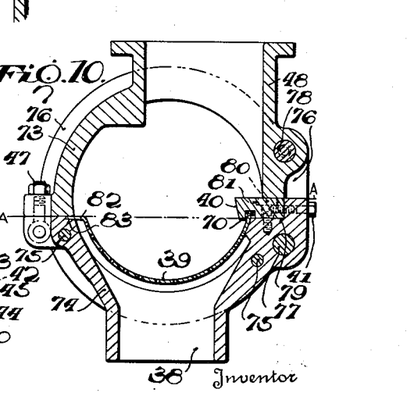
Fig. 10 is a sectional end view of a fourth form of casing, including the screen and mangle knife, which may be used in embodying the present invention.

In Fig. 10 there is shown still a fourth form of casing which may be used in cutters embodying the present invention, this casing being generally of the same construction as that shown in Figs. 1–4, but differing therefrom primarily in the way in which the two portions of the casing are mounted and in the fact that the plane along which the casing opens is below the horizontal plane of the axis of the machine. Since this fourth embodiment of casing is adapted for use with any of the cutting mechanisms previously described, Fig. 10 shows only the casing and associated elements and omits the details of the cutting mechanism such as are shown in Figs. 4, 7 and 9.

As illustrated, the modified casing of Fig. 10 comprises upper and lower casing elements 73 and 74, respectively, the upper element being slightly more, and the lower element slightly less, than semicircular in circumferential extent. Lower casing element 74 is adapted to be secured by bolts 75 to a fixed part 76 of the machine which may correspond either to the knife bed 29 of Figs. 1–4 or to the housing extension 10' of Figs. 5–9, a dowel pin 77 also being provided to accurately locate this half of the casing with respect to the part 76, to relieve the bolts 75 of shocks to which the casing is subjected during operation, and also to permit the lower casing element 74 to swing open downwardly after the bolts 75 have been removed.

The upper casing element 73 is pivotally mounted on a shoulder bolt 78 carried by the fixed part 76 of the machine, and is so constructed at its lower surface as to cooperate and mate with the upper surface of lower casing element 74, the two parts of the casing dividing along the line A—A, instead of along the horizontal center line of the machine as in the previous embodiments. When the casing is closed, the two parts thereof are locked together by a clamping eyebolt 47, just as in the constructions shown in Figs. 1–7.

The mangle knife 40 is supported on a shoulder 79 formed in lower casing element 74 and is adjusted by a pair of bolts 41 which extend horizontally through the wall of the casing similarly to the showing of Fig. 9. The mangle knife may also be provided with a vertically extending holddown bolt 80 which is housed in a suitable elongated, countersunk recess 81 formed in the knife and is threaded into lower casing element 74. The lower surface of mangle knife 40 is preferably provided with a recess 70 for receiving and positioning one end of the screen 39 (also similar to the construction of Fig. 9), while the other end of the screen has a horizontally projecting portion 82 which fits into a suitable recess 83 formed in the upper surface of lower casing element 74, and is held therein by the lower surface of upper casing element 73 when the casing is closed.

With this construction, the casing may be opened for cleaning and other purposes by releasing clamping eyebolt 47 and swinging the upper casing element 73 out of the way about shoulder bolt 78. Since the casing divides along the line A—A, it will be seen that merely opening the upper portion of the casing exposes more than half of the end area of the machine and provides greater access to the parts than do the first three embodiments wherein the casing divides along the horizontal center line of the machine. If still further access to the cutting elements is desired, the bolts 75 may be removed and the lower casing element 74 swung downwardly about dowel pin 77. When this is done, it is also possible to remove a cutting ring like that shown in Figs. 6–9, should the machine be so equipped, without completely detaching the lower casing element from the machine.

It will now be apparent that the present invention provides a novel rotary cutter suitable for cutting, granulating, grinding, pulverizing or shredding many different materials which possesses a number of advantages over similar devices heretofore known to the art. By locating both the supply and delivery conduits, and a relatively large chamber to and from which the material is delivered, in an axially offset position relative to the fixed cutting knives, it is possible to provide a continuous, uninterrupted knife bed in which a relatively large number of fixed knives may be placed about the entire periphery of the path of movement of the rotary cutters. This elimination of the necessity for openings in the knife bed to receive the supply hopper and delivery screen enables the knife bed to be formed as an integral member and turned from a simple forging, in comparison with conventional machines of similar character wherein the stationary knife bed usually requires either a complicated casting, or in some cases, two or three castings for its formation. Because of the larger number of stationary knives provided by the cutters of the present invention, the knives may be made shorter than customary without any decrease in capacity, while the increased frequency of the cutting operations, and the decreased intensity of the shocks created thereby, result in less severe operating conditions than are encountered in machines having fewer and larger knives.

The greater compactness of the cutting elements of the present devices results in an intensive working of the material in a relatively small space, thereby lessening the friction of stirring the material, permitting higher speeds of operation, and increasing capacity. In any of the machines disclosed herein, the hopper may be filled with material and the machine left without further attention by the operator until all of the material has been cut or granulated, whereas the machines heretofore available to the art, particularly those especially adapted for granulating plastic molding materials, require constant supervision by an operator and gradual feeding of the material thereto in order to avoid overheating. Another characteristic of the machines of the present invention is their simplicity of construction and the ease with which access may be had to the interiors thereof for cleaning, adjustment or replacement of parts, and similar purposes. These and other features, which should be apparent from the foregoing disclosure, endow the present invention with substantial advantages over machines of the same general character hitherto known to the art.

Although several specific forms of machine have been described and illustrated in the accompanying drawings, it will be obvious that the invention is not limited to the exact structures shown, but is capable of a variety of mechanical embodiments. Various changes, which will now suggest themselves to those skilled in the art, may be made in the form, details of construction and arrangement of the parts without departing from the spirit of the invention. Reference is therefore to be had to the appended claims for a definition of the limits of the invention.

What is claimed is:

1. In a rotary cutter, rotatable cutting means, fixed cutting means disposed about the periphery of the path of movement of said rotatable cutting means, means forming a chamber axially offset from said fixed cutting means, means for supplying material to be cut to said chamber, means for moving material from said chamber into the zone of action of said cutting means, means for preventing the escape of material from said zone of action in an axial direction opposite to that in which said chamber lies relatively to said fixed cutting means, and means for delivering the material from said chamber after it has been operated upon by said cutting means.

2. In a rotary cutter, rotatable cutting means, fixed cutting means disposed about the periphery of the path of movement of said rotatable cutting means, means forming a chamber axially offset from said fixed cutting means, said rotatable cutting means being so constructed and arranged that a portion thereof extends into said chamber, means for supplying material to be cut to said chamber, and means for delivering the material from said chamber after it has been operated upon by said cutting means.

3. In a rotary cutter, rotatable cutting means, fixed cutting means disposed about the periphery of the path of movement of said rotatable cutting means, means forming a chamber axially offset from said fixed cutting means, said rotatable cutting means being so constructed and arranged that a portion thereof extends into said chamber, means for supplying material to be cut to said chamber, a mangle knife in said chamber adapted to cooperate with the portion of said rotatable cutting means extending into said chamber for effecting a preliminary breaking of the material within said chamber, and means for delivering the material from said chamber after it has been reduced to a predetermined size by said cutting means.

4. In a rotary cutter, rotatable cutting means, a plurality of fixed cutting members spaced about the periphery of the path of movement of said rotatable cutting means but of less axial extent than the latter, a mangle knife offset axially from said fixed cutting members for cooperation with said rotatable cutting means, material feeding means offset axially from said fixed cutting members and so constructed and arranged as to feed material to the zone of action of said mangle knife and rotatable cutting means, and material delivery means also offset from said fixed cutting members and positioned beneath said material feeding means and mangle knife.

5. In a rotary cutter, a plurality of rotary knives, a plurality of fixed knives spaced about the periphery of the path of movement of said rotary knives but of less axial extent than the latter, a mangle knife offset axially from said fixed knives for cooperation with said rotary knives, material feeding means offset axially from said fixed knives and so constructed and arranged as to feed material to the zone of action of said mangle and rotary knives, material delivery means also offset from said fixed knives and positioned beneath said material feeding means and mangle knife, and screening means for preventing the delivery of material until it has been reduced to predetermined size by said knives.

6. In a rotary cutter, a rotor, knives adjustably mounted on said rotor, a plurality of fixed knives equidistantly spaced about the periphery of the path of movement of said rotor knives but of less axial extent than the latter, a mangle knife offset axially from said fixed knives for cooperation with said rotor knives, material feeding means offset axially from said fixed knives and above said mangle knife, and screened material discharge means also offset axially from said fixed knives and positioned beneath said feeding means and mangle knife.

7. In a rotary cutter including a base and a shaft rotatably mounted in said base, a plurality of knives rotatable with said shaft, an annular knife bed having a conically shaped inner surface fixed relatively to said base in surrounding relation to said rotatable knives, a plurality of fixed knives adjustably mounted in said bed at equidistant intervals around the conical inner surface thereof for cooperation with said rotatable knives but of less axial extent than the latter, said rotatable knives extending outwardly beyond that side of the knife bed having the greater internal diameter, a mangle knife offset axially from said fixed knives and cooperating with the outwardly extending portions of said rotatable knives, material feeding means offset axially from said fixed knives and above said mangle knife, and screened material discharge means also offset from said fixed knives and positioned beneath said feeding means and mangle knife.

8. In a rotary cutter including a base and a shaft rotatably mounted in said base, a rotor secured to said shaft, arms extending axially from said rotor, knives mounted on said arms, an annular knife bed fixed relatively to said base in surrounding relation to said rotor knives, a sealing ring secured to said knife bed in sealing engagement with said rotor, a plurality of fixed knives adjustably mounted in said bed at equidistant intervals around the inner surface thereof for cooperation with said rotor knives but of less axial extent than the latter, said rotor knives having portions extending beyond one side of said bed, a casing element secured to said bed and enclosing the lower half of the periphery of the path of movement of said extending portions of said rotor knives, an adjustable mangle knife carried by said casing element in axially offset relation to said fixed knives for cooperation with the extending portions of said rotor knives, a screened delivery orifice in said casing element, a second casing element hinged to said first named element and enclosing the upper half of the periphery of the path of movement of said extending portions of said rotor knives, and a feed orifice in said second casing element positioned above said mangle knife.

9. In a rotary cutter, a plurality of fixed knives spaced about the periphery of a circle, a plurality of rotary knives having portions rotatable within the circle of said fixed knives for cooperation therewith and other portions integral with and constituting continuations of said first named portions extending axially beyond the ends of said fixed knives, and means for preliminarily breaking the material to be cut by said fixed and rotary knives including a mangle knife axially offset from said fixed knives and mounted for cooperation with the extending portions of said rotary knives.

10. In a rotary cutter, a plurality of fixed knives spaced about the periphery of a circle, a plurality of rotary knives having portions rotatable within the circle of said fixed knives for cooperation therewith and other portions integral with and constituting continuations of said first named portions extending axially beyond the ends of said fixed knives, means for preliminarily breaking the material to be cut by said fixed and rotary knives including a mangle knife axially offset from said fixed knives for cooperation with the extending portions of said rotary knives, and material feeding means so constructed and arranged as to feed the material to be cut by gravity directly to the zone of action of said mangle and rotary knives.

11. In a rotary cutter comprising a plurality of fixed knives spaced about the periphery of a circle and rotary knives having portions rotatable within the circle of said fixed knives for cooperation therewith and other portions extending axially beyond the ends of said fixed knives, means for preliminarily breaking the material to be cut by said fixed and rotary knives including a mangle knife axially offset from said fixed knives for cooperation with the extending portions of said rotary knives, material feeding means so constructed and arranged as to feed the material to be cut to the zone of action of said mangle and rotary knives, and screened material delivery means also axially offset from said fixed knives and positioned beneath said mangle knife.

12. In a rotary cutter, a plurality of fixed knives spaced about the periphery of a circle, rotary cutting means having a portion thereof rotatable within the circle of said fixed knives for cooperation therewith and another portion extending axially beyond the ends of said fixed knives, a casing surrounding the periphery of the path of movement of said extending portion of the rotary cutting means and providing a chamber offset axially from the fixed knives for the material to be cut by said fixed knives and rotary cutting means, means opening directly into said chamber but laterally offset from the vertical plane of the axis of said fixed knives and rotary cutting means for feeding material to said chamber, and means in addition to the lateral displacement of said feeding means for preventing the return of material into the latter including a flattened baffling surface formed in the circumferential wall of said casing adjacent the inner end of said feeding means.

13. In a rotary cutter, a plurality of fixed knives spaced about the periphery of a circle, rotary cutting means having a portion thereof rotatable within the circle of said fixed knives for cooperation therewith and another portion extending axially beyond the ends of said fixed knives, a casing surrounding the periphery of the path of movement of said extending portion of the rotary cutting means and providing a chamber offset axially from the fixed knives for the material to be cut by said fixed knives and rotary cutting means, a feed conduit opening directly into said chamber but offset laterally from the vertical plane of the axis of said fixed knives and rotary cutting means for feeding material to said chamber, and means in addition to the lateral displacement of said conduit for preventing the return of material into the latter including a flattened baffling surface formed in the circumferential wall of said casing adjacent the lower end of said conduit.

14. In a rotary cutter, a plurality of fixed knives spaced about the periphery of a circle, rotary cutting means having a portion thereof rotatable within the circle of said fixed knives for cooperation therewith and another portion extending axially beyond the ends of said fixed knives, a casing surrounding the periphery of the path of movement of said extending portion of the rotary cutting means and providing a chamber offset axially from the fixed knives for the material to be cut by said fixed knives and rotary cutting means, said casing comprising upper and lower casing elements separable from one another along a horizontal plane to provide access to said fixed knives and rotary cutting means, a feed conduit in the upper casing element laterally offset from the vertical axis of said fixed knives and rotary cutting means, and a screened delivery conduit in the lower casing element.

15. In a rotary cutter, a plurality of fixed knives spaced about the periphery of a circle, rotary cutting means having a portion thereof rotatable within the circle of said fixed knives for cooperation therewith and another portion extending axially beyond the ends of said fixed knives, a casing surrounding the periphery of the path of movement of said extending portion of the rotary cutting means and providing a chamber offset axially from the fixed knives for the material to be cut by said fixed knives and rotary cutting means, said casing comprising upper and lower casing elements hingedly connected to one another and separable along a horizontal plane through the axis of rotation of said rotary cutting means to provide access to the latter and to said fixed knives, a feed conduit in the upper casing element, a mangle knife carried by the lower casing element for cooperation with the extending portion of said rotary cutting means and positioned beneath said feed conduit, and a screened delivery conduit in the lower casing element beneath said mangle knife.

16. In a rotary cutter, a plurality of fixed knives spaced about the periphery of a circle, rotary cutting means having a portion thereof rotatable within the circle of said fixed knives for cooperation therewith and another portion extending axially beyond the ends of said fixed knives, a casing surrounding the periphery of the path of movement of said extending portion of the rotary cutting means and providing a chamber offset axially from the fixed knives for the material to be cut by said fixed knives and rotary cutting means, said casing comprising a lower casing element open at the outer end, including a downwardly projecting portion forming an open ended delivery conduit, and an upper casing element hingedly connected to said lower element and including a downwardly depending plate adapted to close the open end of said lower element, including its delivery conduit portion, and means carried by said upper casing element for feeding material to be cut to said chamber.

17. In a rotary cutter including a base and a shaft journaled in said base, cutting means rotatable with said shaft, an annular cutter ring fixed relatively to said base having a plurality of inwardly extending cutting elements formed integrally therewith and surrounding the periphery of the path of movement of said rotatable cutting means for cooperation therewith, said cutting elements being of less axial extent than said rotatable cutting means, a casing axially offset from said cutter ring enclosing the periphery of the path of movement of the portion of said rotatable cutting means extending beyond the axial limits of said fixed cutting elements, means for feeding material to be cut to the interior of said casing, and means for delivering the cut material from said casing after it has been reduced to predetermined size by said rotatable cutting means and fixed cutting elements.

18. In a rotary cutter including a base and a shaft journaled in said base, cutting means rotatable with said shaft, an annular cutter ring fixed relatively to said base having a plurality of inwardly extending cutting elements formed integrally therewith and surrounding the periphery of the path of movement of said rotatable cutting means for cooperation therewith, said cutting elements being of less axial extent than said rotatable cutting means, a casing axially offset from said cutter ring enclosing the periphery of the path of movement of the portion of said rotatable cutting means extending beyond the axial limits of said fixed cutting elements, said casing being formed in one piece and adapted for detachable connection to said base and including an upwardly extending feed conduit portion and a downwardly extending delivery conduit portion, and a screen removably disposed in said casing across the delivery conduit.

19. In a rotary cutter including a base and a shaft journaled in said base, cutting means rotatable with said shaft, an annular cutter ring fixed relatively to said base having a plurality of inwardly extending cutting elements formed integrally therewith and surrounding the periphery of the path of movement of said rotatable cutting means for cooperation therewith, said cutting elements being of less axial extent than said rotatable cutting means, a casing axially offset from said cutter ring enclosing the periphery of the path of movement of the portion of said rotatable cutting means extending beyond the axial limits of said fixed cutting elements, said casing being formed in one piece and adapted for detachable connection to said base and including an upwardly extending feed conduit portion and a downwardly extending delivery conduit portion, a screen removably disposed in said casing across the delivery conduit, a mangle knife mounted with said casing for cooperation with said rotatable cutting means, and means for adjusting the position of said mangle knife operable from the exterior of said casing.

20. In a rotary cutting machine of the type including a plurality of fixed cutting elements spaced about the periphery of a circle, and rotary cutting means having a portion thereof rotatable within the circle of said fixed cutting elements for cooperation therewith and another portion extending axially beyond said fixed cutting elements, a casing surrounding the periphery of the path of movement of said extending portion of the rotary cutting means and providing a chamber offset axially from the fixed cutting elements for the material to be cut by said fixed cutting elements and rotary cutting means, comprising upper and lower casing elements separable from one another along a horizontal plane located below the axis of rotation of said rotary cutting means, means for detachably connecting said lower casing element to a fixed portion of the machine, and means carried by said fixed portion of the machine for mounting said upper casing element for pivotal movement relatively to said lower casing element.

21. In a rotary cutting machine of the type including a plurality of fixed cutting elements spaced about the periphery of a circle, and rotary cutting means having a portion thereof rotatable within the circle of said fixed cutting elements for cooperation therewith and another portion extending axially beyond said fixed cutting elements, a casing surrounding the periphery of the path of movement of said extending portion of the rotary cutting means and providing a chamber offset axially from the fixed cutting elements for the material to be cut by said fixed cutting elements and rotary cutting means, comprising upper and lower casing elements separable from one another along a horizontal plane located below the axis of rotation of said rotary cutting means, means for detachably connecting said lower casing element to a fixed portion of the machine, a dowel pin carried by said fixed portion of the machine and engaging said lower casing element about the axis of which said element is free to rotate when said connecting means have been removed so as to provide access to the lower portions of said fixed cutting elements and rotary cutting means, and means carried by said fixed portion of the machine on which said upper casing element is mounted for pivotal movement relatively to said lower casing element to provide access to the upper portion of said fixed cutting elements and rotary cutting means.

FRED M. RODDY.